United States Patent
Hymel et al.

[11] Patent Number: 6,031,467
[45] Date of Patent: Feb. 29, 2000

[54] METHOD IN A SELECTIVE CALL RADIO FOR ENSURING RECEPTION OF ADVERTISEMENT MESSAGES

[75] Inventors: James Allen Hymel, Lake Worth; Eduardo Guntin, Parkland, both of Fla.

[73] Assignee: Motorola, Inc., Shaumburg, Ill.

[21] Appl. No.: 09/144,236

[22] Filed: Aug. 31, 1998

[51] Int. Cl.$^7$ .................................................. H04Q 1/00
[52] U.S. Cl. .............................. 340/825.44; 340/825.47; 340/825.22; 340/311.1; 455/38.1; 455/228
[58] Field of Search ................... 340/825.44, 825.47, 340/311.1, 825.22; 455/38.1, 228

[56] References Cited

U.S. PATENT DOCUMENTS

| | | | |
|---|---|---|---|
| 4,639,726 | 1/1987 | Ichikawa et al. | 340/825.44 |
| 4,894,649 | 1/1990 | Davis | 340/825.44 |
| 5,430,439 | 7/1995 | Bodet et al. | 340/825.44 |
| 5,539,395 | 7/1996 | Buss et al. | 340/825.44 |

*Primary Examiner*—Brian Zimmerman
*Assistant Examiner*—Yves Dalencourt
*Attorney, Agent, or Firm*—Pablo Meles; Eduardo Guntin

[57] ABSTRACT

An SCR (122) that receives personal messages and corresponding advertisement messages, includes a receiver (304), memory (310), presentation circuit (313) and processor (308). The processor is adapted to cause the receiver to receive a personal message (402), to determine whether a corresponding advertisement message has been previously stored in the memory (404), and in the event the corresponding advertisement message is not found, cause (406, 410) the presentation circuit to present the personal message to a user of the SCR. Additionally, the processor causes the presentation circuit to present a warning (412) to the user that the SCR must receive the corresponding advertisement message within a predetermined time.

15 Claims, 4 Drawing Sheets

METHOD IN A SELECTIVE CALL RADIO FOR ENSURING RECEPTION OF ADVERTISEMENT MESSAGES

RELATED INVENTIONS

The present invention is related to the following inventions which are assigned to the same assignee as the present invention:

Application Ser. No. 08/627,642 filed by Deluca et al., entitled "Advertiser Pays Information and Messaging System and Apparatus;" and Application Ser. No. 09/036,978 filed by Hymel, entitled "Controlling Access to a Feature of a Selective Call Receiver that Stores Advertisements."

FIELD OF THE INVENTION

This invention relates in general to radio communication systems, and particularly, to a method in a selective call radio for ensuring reception of advertisement messages.

BACKGROUND OF THE INVENTION

Radio communication systems that transmit selective call messages to SCRs (selective call radios), such as cellular phones and pagers, have been in use for some time now. The type of selective call messages transmitted to SCRs range anywhere from personal messaging (e.g., pages, telephonic messages) to information services (e.g., advertising, news, weather, etc.).

In some cases, service providers furnish free service to end users of the SCR by way of sponsorship from advertisers. Generally, advertisers sponsor free service under the condition that the service providers ensure that the end users of the SCRs receive their advertisement messages, and that such messages are displayed to the end users prior to presentation of the end user's personal messages. The advertisement messages are generally transmitted periodically over a twenty-four hour period to the SCRs. It is not uncommon for an end user to turn off the SCR during the nighttime as a means for conserving battery power. As a consequence of this action, advertisement messages transmitted during the nighttime are not received by the SCR. Moreover, if the advertisement messages are transmitted only during the nighttime, an end user can intentionally circumvent receiving nighttime advertisement while continuing to receive free service for personal messaging. This situation clearly violates the condition set by the advertisement sponsors for providing free services to end users.

Accordingly, a need exists for a method in a selective call radio for ensuring reception of advertisement messages.

BRIEF DESCRIPTION OF THE DRAWINGS

The present invention is pointed out with particularity in the appended claims. However, other features of the invention will become more apparent and best understood by referring to the following detailed description in conjunction with the accompanying drawings in which:

DESCRIPTION OF THE PREFERRED EMBODIMENT

Figure 1:
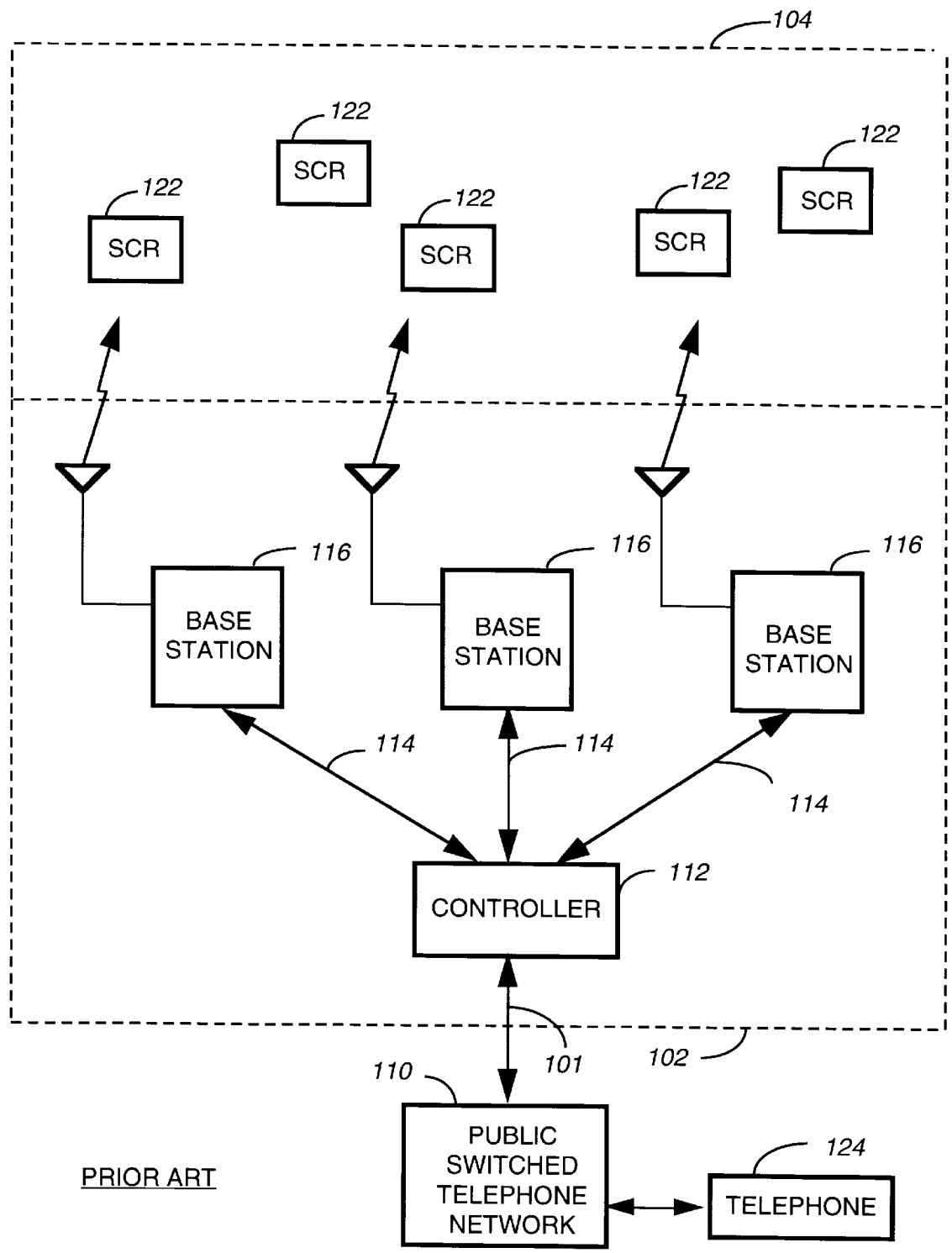
FIG. 1 is an electrical block diagram of a communication system utilized by the present invention.

FIG. 1 is an electrical block diagram of a communication system 100 according to the present invention. The communication system 100 comprises a radio communication system 102 and a portable portion 104 comprising a plurality of SCRs 122 (selective call radios). The radio communication system 102 includes a controller 112 for controlling operation of a plurality of base stations 116 by way of conventional communication links 114, such as, e.g., microwave links. The plurality of SCRs 122 in the portable portion 104 are used for receiving selective call messages from the base stations 116 under the control of the controller 112.

The controller 112 receives messages from callers utilizing a conventional telephone 124 for communicating with a conventional PSTN (public switch telephone network) 110. The PSTN 110 relays messages to the controller 112 through a conventional telephone line 101 coupled to the controller 112. Upon receiving messages from the PSTN 110, the controller 112 processes the messages, and delivers them to the base stations 116 for transmission to designated SCRs 122. In addition to transmitting selective call messages, the controller 112 is programmed to either selectively transmit or broadcast advertisements to the plurality of SCRs 122.

Figure 2:
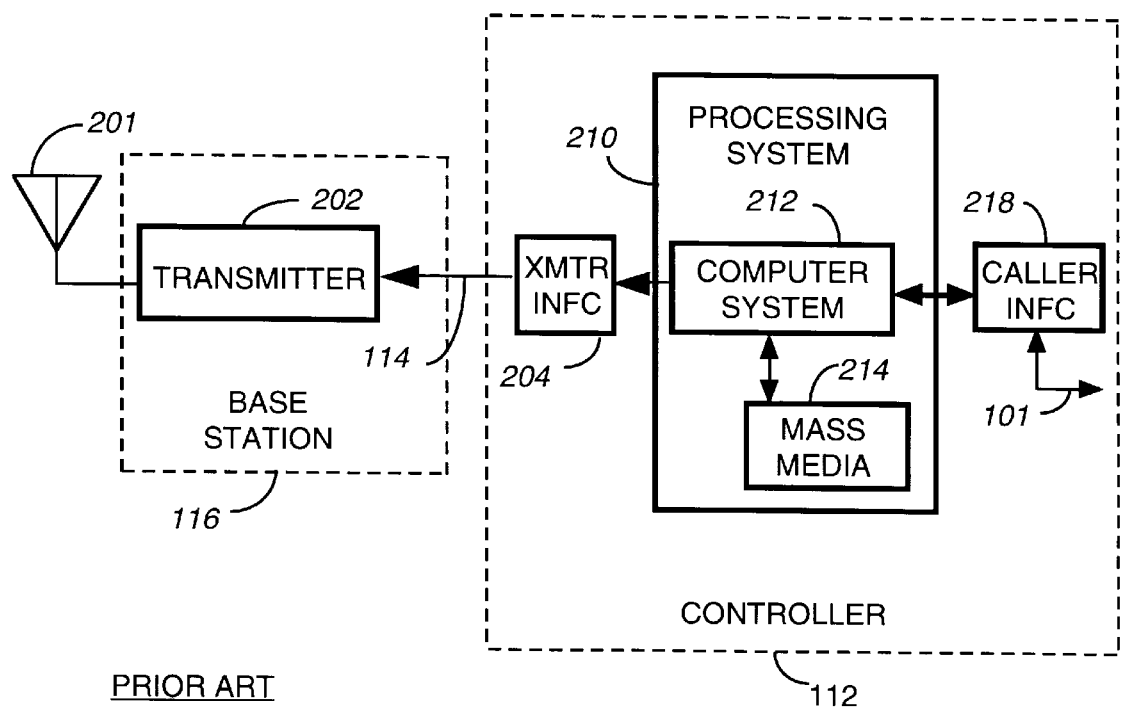
FIGS. 2 and 3 are electrical block diagrams of the radio communication system and the SCR (selective call radio) of FIG. 1, respectively.
Figure 3:
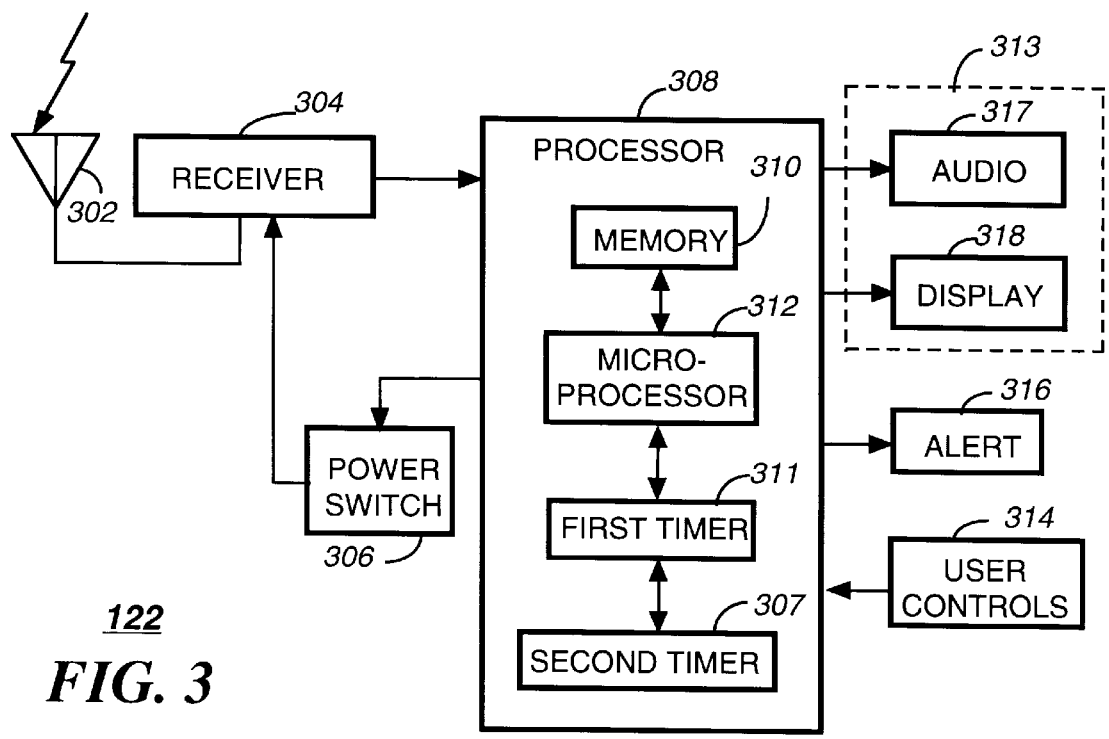

FIGS. 2 and 3 are electrical block diagrams of the radio communication system 102 and the SCR 122 of FIG. 1, respectively. The electrical block diagram of the radio communication system 102 includes the elements of the controller 112 and the base stations 116. The controller 112 comprises a conventional processing system 210 for controlling operation of the base stations 116, a conventional caller interface 218 for receiving messages from the PSTN 110, and a conventional transmitter interface 204 for communicating messages to the base stations 116. The processing system 210 includes conventional hardware such as a computer system 212 and mass media 214 to perform the programmed operations of the controller 112. The base stations 116 comprise a conventional RF transmitter 202 coupled to an antenna 201 for transmitting the messages received from the controller 112.

The SCR 122 comprises an antenna 302 for intercepting RF signals from the radio communication system 102. The antenna 302 is coupled to a receiver 304 employing conventional demodulation techniques for receiving the communication signals transmitted by the radio communication system. Radio signals received by the receiver 304 produce demodulated information, which is coupled to a processor 308 for processing received messages. A conventional power switch 306, coupled to the processor 308, is used to control the supply of power to the receiver 304 from a conventional battery source, thereby providing a battery saving function.

To perform the necessary functions of the SCR 122, the processor 308 includes a microprocessor 312, first and second timers 311, 307 and a memory 310 that includes, for example, a random access memory (RAM), a read-only memory (ROM), and an electrically erasable programmable read-only memory (EEPROM). The processor 308 is programmed by way of the ROM to process incoming messages transmitted by the radio communication system 102. The processor 308 decodes an address in the demodulated data of the received message, compares the decoded address with one or more addresses assigned and stored in the EEPROM of the SCR 122, and when a match is detected, proceeds to process the remaining portion of the message if predetermined expectation criteria is satisfied, as will be described below.

Assuming the processor 308 decides to process the message, it stores the message in the RAM, and a call alerting signal is generated to alert a user that a message has been received. The call alerting signal is directed to a conventional audible or tactile alerting device 316 for generating an audible or tactile call alerting signal. The message can be accessed by the user through user controls 314, which provide functions such as lock, unlock, delete, read, etc. More specifically, by the use of appropriate functions provided by the user controls 314, the message is recovered from the RAM, and conveyed to the user by way of a presentation circuit 313, which includes a display 318 (e.g., a conventional liquid crystal display—LCD) for alphanumeric messaging and an audio circuit 317 for audio messages. It will be appreciated that, alternatively, the display 318 can be accompanied with an audio circuit (not shown) for conveying, for example, audio-visual voice messages.

Preferably, the communication system 100 employs one of the Flex™ family of protocols, developed by Motorola, Inc. (Flex™ is a trademark of Motorola, Inc.), for transmitting messages to the SCRs 122. The Flex™ protocol is a digital selective call signaling protocol that is presently used by various system operators in the United States and in several other countries. It will be appreciated that, alternatively, other digital signaling protocols may be used that are suitable with the present invention.

Figure 4:
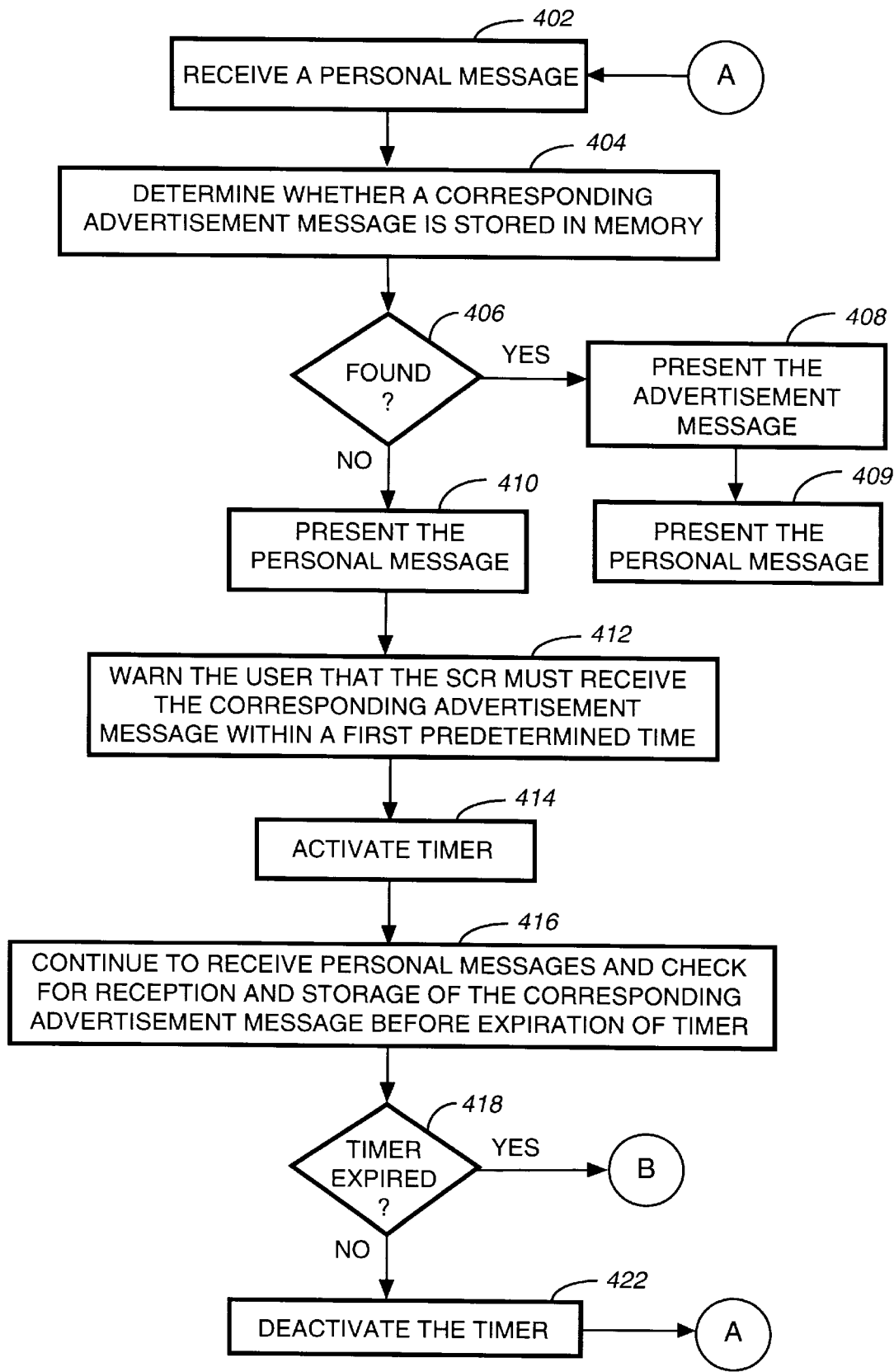
FIGS. 4 and 5 depict flowcharts summarizing the operation of the SCR of FIG. 1 according to the present invention.

FIG. 4 depicts a flowchart 400 summarizing the operation of the SCR 122 of FIG. 1 according to the present invention. Flowchart 400 depicts the programmed steps of the SCR 122, which are preferably stored in the memory 310 of the processor 308. The flowchart 400 begins with step 402 where the SCR 122 receives a personal message from a base station 116 of the radio communication system 100. A personal message comprises caller initiated messages and/or an information services message such as, for example, news, weather and/or sports. For an end user of the SCR 122 that receives free subscription based on sponsorship from an advertiser, the personal message is associated with a corresponding advertisement message.

Preferably, the personal message and its corresponding advertisement message share a common identifier. The common identifier can be for instance a shared address. The shared address is stored in the EEPROM, which the processor 308 utilizes to identify that an incoming personal message and/or advertisement message is intended for the SCR 122. It will be appreciated by one of ordinary skill in the art that there may be any number of other methods for sharing a common identifier between the personal message and its corresponding advertisement message other than simply the use of a shared address.

Once the SCR 122 has received the personal message, and the end user of the SCR 122 has requested presentation of the personal message, the processor 308 proceeds to step 404 where it determines whether a corresponding advertisement message is stored in the memory 310. If the corresponding advertisement message is stored in memory 310, then the processor 308 proceeds from step 406 to step 408 where it presents the corresponding advertisement message followed by the personal message in step 409. In the event the processor 308 fails to find the corresponding advertisement message in step 406, the processor 308 proceeds to step 410.

In this step, the processor 308 causes the presentation circuit 313 to present the personal message to the user of the SCR 122 by way of either the display 318 or the audio circuit 317 according to the type of personal message (alphanumeric or audio). Then in step 412, the processor 308 warns the user that the SCR 122 must receive the corresponding advertisement message within a first predetermined time. It will be appreciated that, alternatively, the warning is provided prior to the presentation of the personal message in step 410. In either order, the warning instructs the user how to place the SCR 122 in an optimal mode for receiving the corresponding advertisement message. For example, the warning message may instruct the user not to turn off the SCR 122 during the nighttime or for at least a twenty-four hour period.

Once the user has been warned, the processor 308 proceeds to step 414 where it activates the first timer 311 which will invoke an alert signal within the first predetermined time, unless deactivated in the manner discussed below. It will be appreciated that, alternatively, the first timer 311 may be implemented by way of a conventional software timer. In any event, the first predetermined time has a duration in hours, days, weeks or months. Preferably, however, the predetermined time is limited to no more than a few days in order to prevent a user from avoiding the reception of advertisement messages over long periods of time.

Additionally, the predetermined time is preprogrammed into the SCR 122 by the service provider of the radio communication system 100 prior to delivering the SCR 122 to an end user. Alternatively, however, the predetermined time may be programmed according to information received by the SCR 122 in a setup message transmitted by the base station 116 of the radio communication system 100. Under this embodiment, the service provider of the radio communication system 100 has the option to remotely re-program the predetermined time of each SCR 122 at will.

Following the activation of the first timer 311, the processor 308 proceeds to step 416 where it continues to receive personal messages. For each personal message received, the processor 308 checks for the reception and storage of the corresponding advertisement message. In a best case scenario, the corresponding advertisement message is received prior to the expiration of the first timer 311. When this happens, the processor 308 proceeds from step 418 to step 422 where it deactivates the first timer 311 and proceeds to step 402 and subsequent steps as described earlier.

Figure 5:
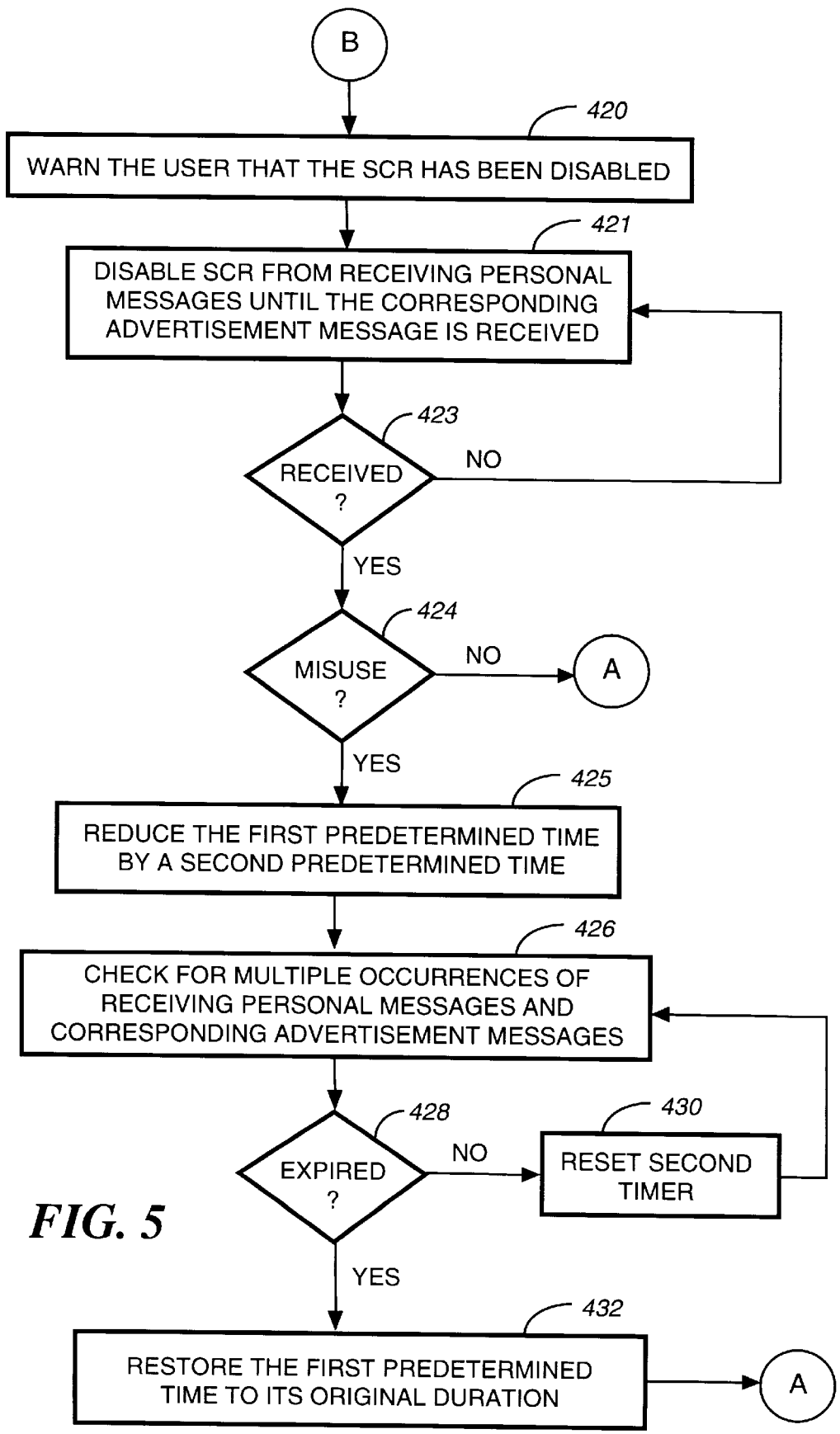

If, however, in step 418 the first timer 311 expires prior to the reception of the corresponding advertisement message, thereby generating an alert signal to the processor 308, then the processor 308, in step 420 of FIG. 5, warns the user that the SCR 122 has been disabled from receiving personal messages. The warning instructs the user how to go about re-enabling the SCR 122 to receive personal messages— such as, for example, maintaining the SCR 122 powered on for a twenty-four hour period. The processor 308 then proceeds to step 421 where it disables reception of personal messages until the corresponding advertisement message is received. The processor 308 maintains this mode of operation until, in step 423, the corresponding advertisement message is received.

Upon receiving the corresponding advertisement message, the processor 308 proceeds to step 424 where it determines if there is a history of misuse, i.e., intentional avoidance of advertisement messages, by the end user of the SCR 122. This may be measured by the frequency that steps 420, 421 have been performed upon expiration of the first timer 311. If there is no indication of misuse, then the processor 308 proceeds to step 402 as described earlier. This step accounts for an end user who occasionally inadvertently places the SCR 122 in a condition where advertisement messages cannot be received.

If there is a history of intentional misuse, then the processor 308, in step 425, reduces the first predetermined time by a second predetermined time, which has a duration less than the first predetermined time. The purpose of this reduction is to effectively reduce the grace period for receiving the corresponding advertisement message. By reducing the grace period, a user who frequently misuses the SCR 122 will be given less time for receiving personal messages free of charge. In extreme cases, the processor 308 would eventually perform step 424 enough times to warrant immediate disablement of the SCR 122 at steps 421 and 423.

As an example, assume that the first predetermined time has a duration of twenty-four hours, and the second predetermined time has a duration of two hours. Upon a first assertion of the alert signal as a result of the expiration of the first timer 311, the first predetermined time will be reduced to twenty-two hours, i.e., a two hour reduction. Thus, on the next occurrence of receiving a personal message with a missing corresponding advertisement message, the first timer 311 will be set to expire in twenty-two hours. Eventually, habitual misuse of the SCR 122 will lead to immediate disablement of the SCR 122 in steps 421 and 423. As an additional penalty, the processor 308 can be programmed to augment the second predetermined time based on a recurring history of misuse of the SCR 122 by an end user, thereby causing the SCR 122 to be disabled at a more rapid pace.

The penalty incurred by the above grace period reduction method may be remedied, however, by a user who subsequently utilizes the SCR 122 as it was intended to be used. This restoration process is illustrated by steps 426–432. Particularly, in step 426 the processor 308 checks for multiple occurrences of receiving personal messages and corresponding advertisement messages for a predetermined period without invoking the alert signal from the first timer 311. The number of occurrences may be programmed into the SCR 122 either remotely through the setup message discussed above, or may be preprogrammed prior to delivering the SCR 122 to the user.

The predetermined period is programmed into a second timer 307, which is activated upon invoking step 424. Similar to the first timer 311, the second timer 307 may also be implemented as a software timer. In any case, the duration of the predetermined period programmed into the second timer 307 is preferably chosen according to the history of misuse of the SCR 122 by an end user. The predetermined period may be for a week, two weeks, a month, etc. For a recurring history of misuse, the predetermined period is augmented such that it will take longer for the user of the SCR 122 to restore the original duration of the first predetermined time. A user who infrequently misuses the SCR 122, will receive a small predetermined period when compared to a user who frequently attempts to avoid receiving advertisement messages.

If the processor 308 detects in step 428 that the alert signal generated by the first timer 311 has not been asserted at the expiration of the second timer 307, then the processor 308 proceeds to step 432 where it restores the original duration of the first predetermined time and proceeds to step 402 as before. Otherwise, the processor 308 continues to step 430 where it resets and re-enables the second timer 307. Thereafter, the processor 308 proceeds to steps 426–428 in the manner described above. It should be noted that proceeding to step 430 is indicative of a continued misuse of the SCR 122. Accordingly, the processor 308 may be programmed to augment the predetermined period according to the additional misuse.

As should be evident from the foregoing discussions, the present invention is substantially advantages over the prior art. Particularly, the present invention provides a method in a SCR 122 for ensuring reception of advertisement messages. Particularly, the method provides the user of a SCR 122 a grace period to place the SCR 122 under circumstances that will ensure reception of advertisement messages. Additionally, the method tracks misuse of an SCR 122 by an end user, and provides penalties for continued misuse by way of a reduced grace period and varying restoration periods.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. In an SCR (Selective Call Radio) that receives personal messages and corresponding advertisement messages over the air, a method comprising the steps of:

receiving a personal message;

determining whether a corresponding advertisement message has been previously stored in the SCR;

in the event the corresponding advertisement message is not found, presenting the personal message to a user of the SCR; and warning the user that the SCR must receive the corresponding advertisement message within a first predetermined time wherein the warning step comprises the step of instructing the user how to place the SCR in an optimal mode for receiving the corresponding advertisment message.

2. The method as recited in claim 1, wherein personal messages comprise caller initiated messages and information service messages.

3. The method as recited in claim 1, wherein the warning step comprises the step of activating a first timer that invokes an alert within the first predetermined time.

4. The method as recited in claim 3, further comprising the step of deactivating the first timer upon receiving the corresponding advertisement message prior to the expiration of the first predetermined time.

5. The method as recited in claim 3, upon invoking the alert, the method further comprising the steps of:

disabling the SCR from receiving personal messages; and warning the user that the SCR has been disabled from receiving personal messages.

6. The method as recited in claim 5, wherein the warning step comprises the step of instructing the user how to go about re-enabling the SCR to receive personal messages.

7. The method as recited in claim 5, wherein the SCR is disabled from receiving personal messages until the SCR receives the corresponding advertisement message.

8. The method as recited in claim 7, further comprising the step of reducing the first predetermined time by a second predetermined time, the second predetermined time having a duration less than the first predetermined time.

9. The method as recited in claim 8, further comprising the step of augmenting the second predetermined time based on a recurring history of misuse of the SCR 122 by an end user.

10. The method as recited in claim 8, further comprising the steps of:

activating a second timer for a predetermined period;

restoring the first predetermined time to its original duration after a plurality of occurrences of receiving personal messages and corresponding advertisement messages for the predetermined period without invoking the alert.

11. The method as recited in claim 10, further comprising the step of augmenting the predetermined period based on a recurring history of misuse of the SCR 122 by an end user.

12. The method as recited in claim 1, further comprising the step of programming the first predetermined time according to information received by the SCR in a setup message transmitted by a radio communication system.

13. The method as recited in claim 1, further comprising the step of preprogramming the first predetermined time prior to delivering the SCR to the user.

14. The method as recited in claim 1, wherein the personal message and its corresponding advertisement message share a common identifier.

15. An SCR that receives personal messages and corresponding advertisement messages over the air, comprising:
    a receiver;
    a memory;
    a presentation circuit; and
    a processor coupled to the receiver, the memory and the presentation circuit, the processor adapted to:
       cause the receiver to receive a personal message;
       determine whether a corresponding advertisement message has been previously stored in the memory;
       in the event the corresponding advertisement message is not found, cause the presentation circuit to present the personal message to a user of the SCR; and
       cause the presentation circuit to present a warning to the user that the SCR must receive the corresponding advertisement message within a predetermined time wherein the warning instructs the user how to place the SCR in an optimal mode for receiving the corresponding advertisment message.

\* \* \* \* \*